United States Patent [19]

Lopez

[11] Patent Number: 5,199,215

[45] Date of Patent: Apr. 6, 1993

[54] VEGETATION MAT APPARATUS

[76] Inventor: Martin J. Lopez, 13749 Toby Trail, Grass Valley, Calif. 95945

[21] Appl. No.: 818,153

[22] Filed: Jan. 8, 1992

[51] Int. Cl.⁵ ............................ A01G 1/06; A01G 9/14
[52] U.S. Cl. .................................................... 47/56
[58] Field of Search ............... 47/56, 69, 79, 81, 9 S

[56] References Cited

U.S. PATENT DOCUMENTS

| | | | |
|---|---|---|---|
| 2,300,776 | 11/1942 | Collins | 47/69 |
| 2,401,997 | 6/1946 | Whitman | 47/9 S |
| 3,769,747 | 11/1973 | Chapman, Jr. | 47/9 S |
| 4,955,158 | 9/1990 | Lyon | 47/79 |

FOREIGN PATENT DOCUMENTS

| | | | |
|---|---|---|---|
| 208705 | 2/1976 | France | 47/56 |
| 2630293 | 10/1989 | France | 47/56 |
| 396501 | 7/1966 | Switzerland | 47/56 |
| 2003013 | 3/1979 | United Kingdom | 47/56 |

Primary Examiner—David A. Scherbel
Assistant Examiner—Joanne C. Downs
Attorney, Agent, or Firm—Hugh E. Smith

[57] ABSTRACT

A partition mat includes a flexible fluid impermeable first web mounting a fabric mesh web thereover in a coextensive relationship, with a compacted peat moss third web mounted over the second web and below a fabric fourth web, with the peat moss including a matrix of seed members mounted therewithin, whereupon application of water to the construction effects growth through the fourth web, with the second and fourth webs accommodating expansion of the peat moss web. The apparatus in modified form may be formed in a roll, including a mounting flange for securement to a support flange to permit mounting of the organization to sloped underlying surfaces.

6 Claims, 4 Drawing Sheets

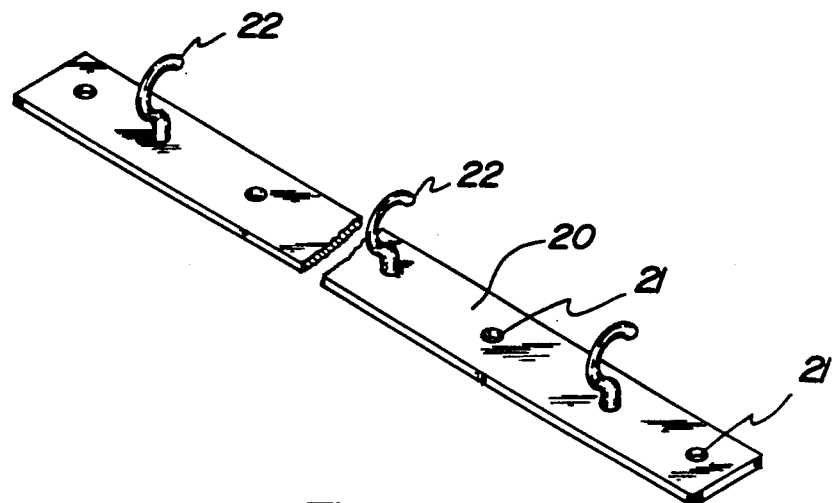
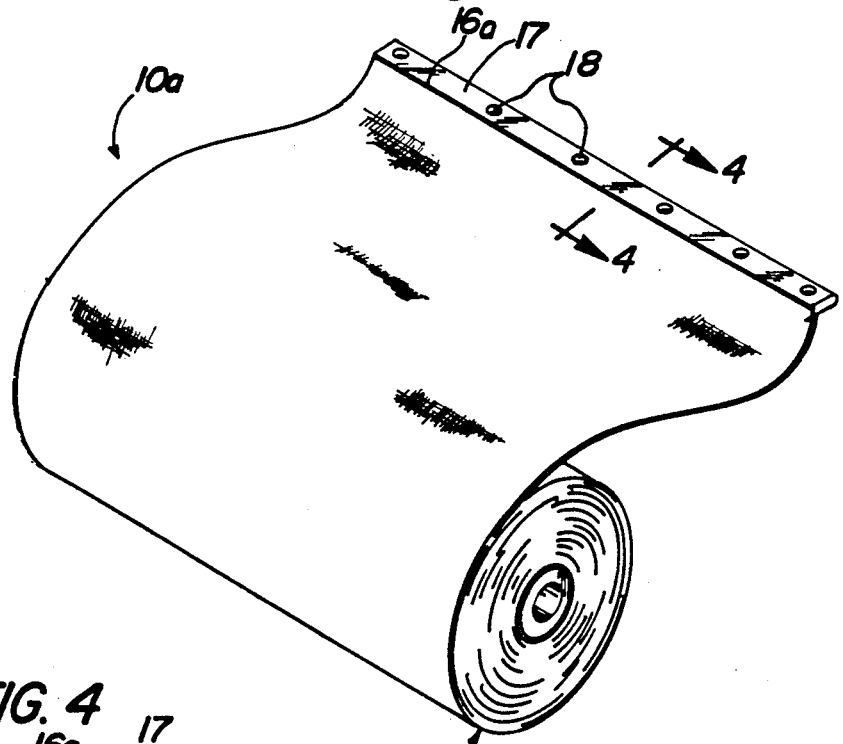
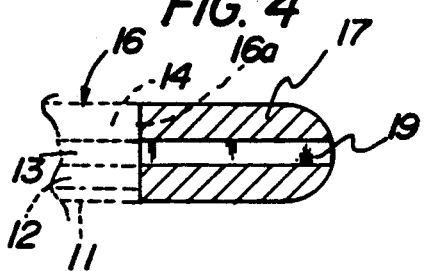

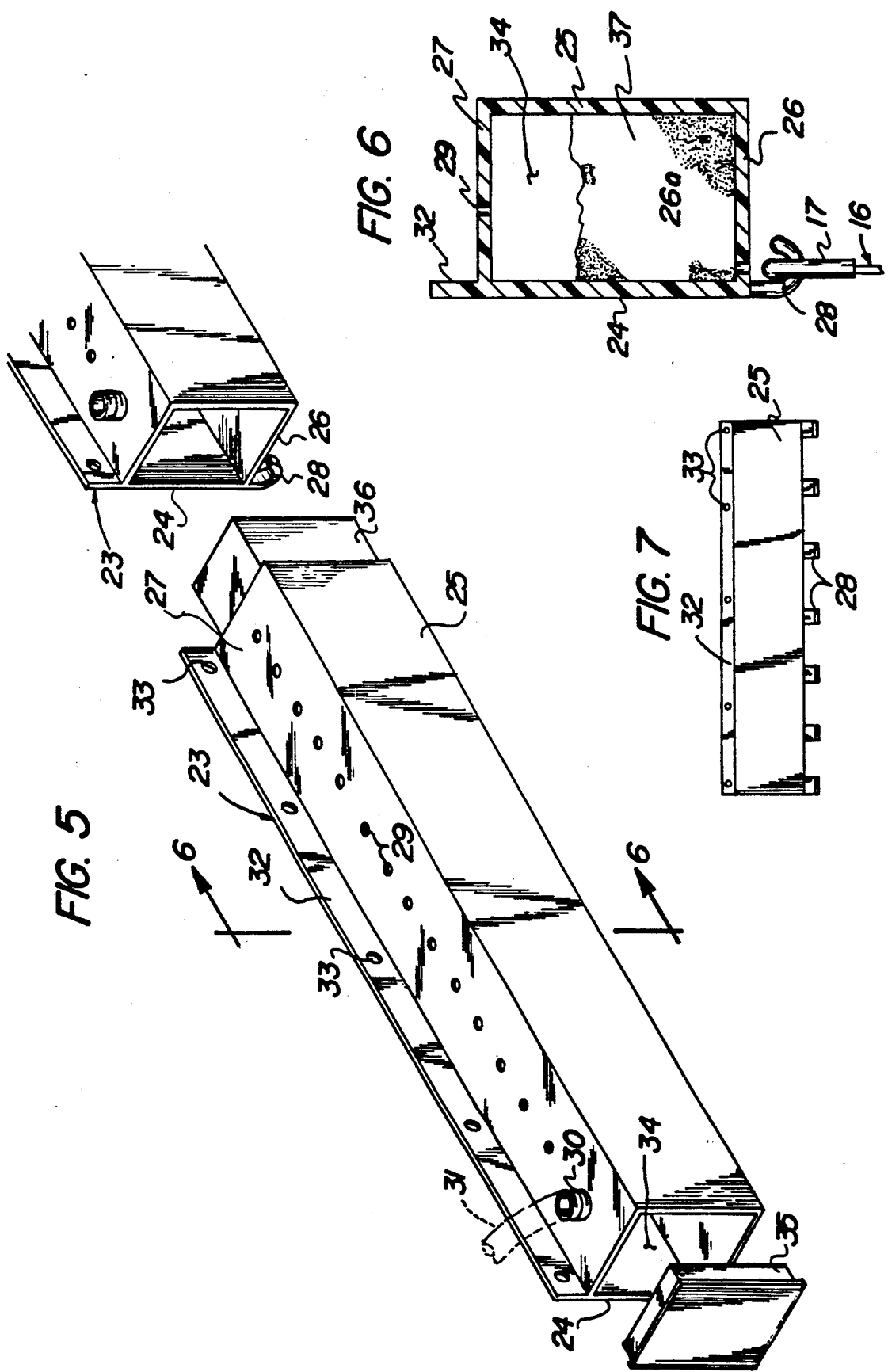

VEGETATION MAT APPARATUS

BACKGROUND OF THE INVENTION

1. Field of the Invention

The field of invention relates to vegetation mat structure, and more particularly pertains to a new and improved vegetation mat apparatus wherein the same is arranged to provide for growth overlying various underlying surfaces, such as walls, fences, and the like.

2. Description of the Prior Art

Vegetation mats for lawns and other type vegetation are available in the prior art and are exemplified in U.S. Pat. No. 4,190,981 to Muldner; U.S. Pat. No. 4,584,790 to Gaughen; U.S. Pat. No. 4,232,481 to Chamoulaud; and U.S. Pat. No. 4,910,911 to Ahm.

The prior art has heretofore, while providing mat type structures for vegetation growth, has failed to provide the configuration and the ease of use in application to various surfaces as present in the instant invention and in this respect, the present invention substantially fulfills this need.

SUMMARY OF THE INVENTION

In view of the foregoing disadvantages inherent in the known types of vegetation mat apparatus now present in the prior art, the present invention provides a vegetation mat apparatus wherein the same is arranged to permit vegetation covering of various underlying surfaces to include medians of highways and the like. As such, the general purpose of the present invention, which will be described subsequently in greater detail, is to provide a new and improved vegetation mat apparatus which has all the advantages of the prior art vegetation mat apparatus and none of the disadvantages.

To attain this, the present invention provides a partition mat including a flexible fluid impermeable first web mounting a fabric mesh web thereover in a coextensive relationship, with a compacted peat moss third web mounted over the second web and below a fabric fourth web, with the peat moss including a matrix of seed members mounted therewithin, whereupon application of water to the construction effects growth through the fourth web, with the second and fourth webs accommodating expansion of the peat moss web. The apparatus in modified form may be formed in a roll, including a mounting flange for securement to a support flange to permit mounting of the organization to sloped underlying surfaces.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vegetation mat apparatus which has all the advantages of the prior art vegetation mat apparatus and none of the disadvantages.

It is another object of the present invention to provide a new and improved vegetation mat apparatus which may be easily and efficiently manufactured and marketed.

It is a further object of the present invention to provide a new and improved vegetation mat apparatus which is of a durable and reliable construction.

An even further object of the present invention is to provide a new and improved vegetation mat apparatus which is susceptible of a low cost of manufacture with regard to both materials and labor, and which accordingly is then susceptible of low prices of sale to the consuming public, thereby making such vegetation mat apparatus enonomically available to the buying public.

Still yet another object of the present invention is to provide a new and improved vegetation mat apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an isometric illustration of a support flange utilized by the invention.

FIG. 3 is an isometric illustration of the mat construction arranged in a roll form utilizing a mounting flange secured at a first end edge surface of the mat roll.

FIG. 4 is an orthographic view, taken along the lines 4—4 of FIG. 3 in the direction indicated by the arrows.

FIG. 5 is an isometric illustration of a support housing utilized by the invention in lieu of the support flange structure of FIG. 2.

FIG. 6 is an orthographic view, taken along the lines 6—6 of FIG. 5 in the direction indicated by the arrows.

FIG. 7 is an orthographic frontal view of the support housing of the invention.

DESCRIPTION OF THE PREFERRED EMBODIMENT

Figure 1:
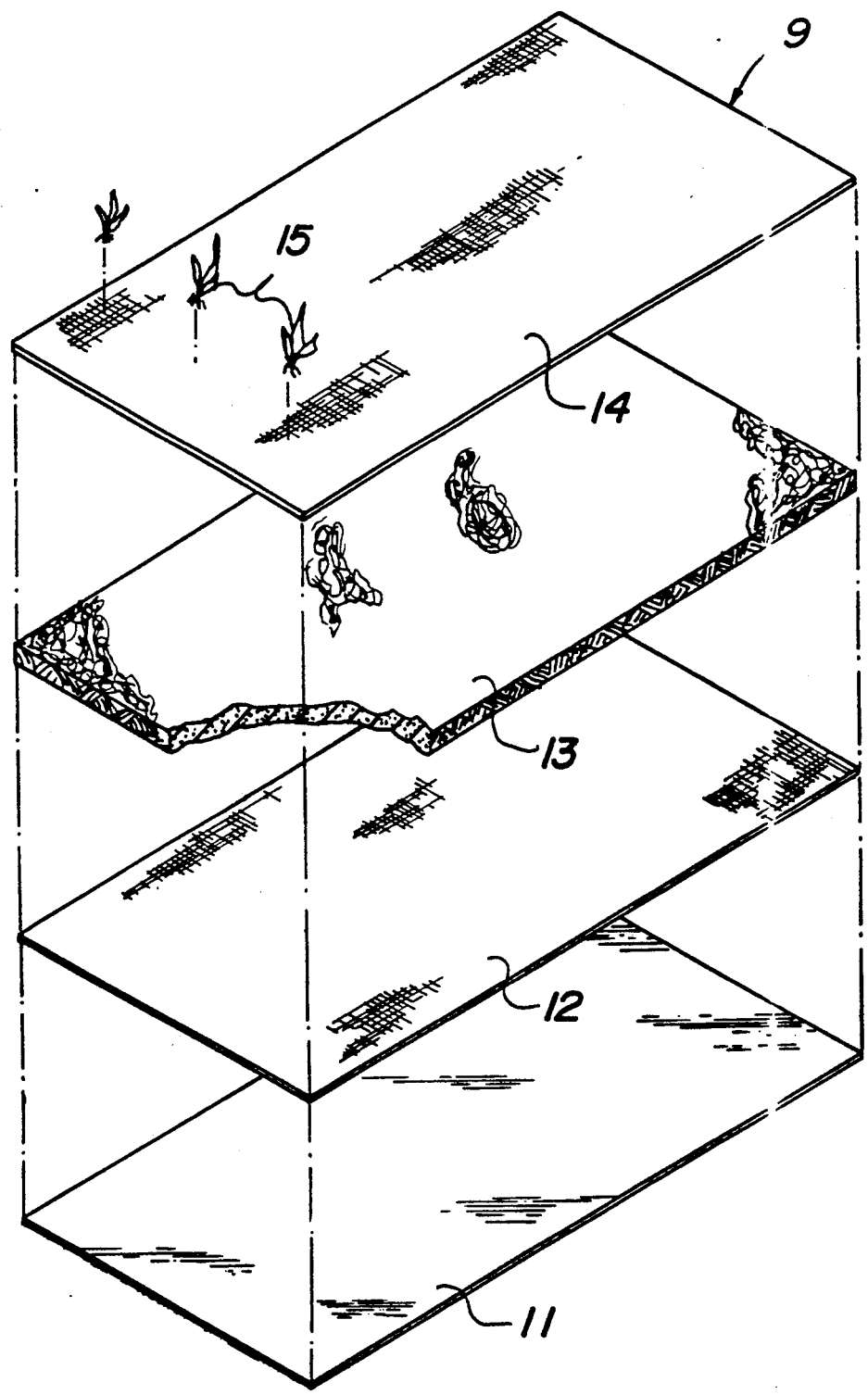
FIG. 1 is an isometric exploded illustration of the instant invention.

With reference now to the drawings, and in particular to FIGS. 1 to 8 thereof, a new and improved vegetation mat apparatus embodying the principles and concepts of the present invention and generally designated by the reference numeral 10 will be described.

More specifically, the vegetation mat apparatus 10 of the instant invention essentially comprises a web assembly 9, including a flexible fluid impermeable polymeric first web 11 functioning as a base web, with a fabric mesh second web 12 mounted coextensively to a top surface of the first web. A compacted peat moss third web matrix 13 is secured to a top portion of the second web coextensive therewith, wherein the third web matrix includes a dispersion of seeds therethrough, whereupon application of water and direction of such water to the third web matrix effects vegetation growth. A fabric fourth web 14 is positioned to a top of the third web matrix 13 to sandwich the third web matrix between the second and fourth fabric webs 12 and 14. In this manner, the fabric webs accommodate expansion and growth of the third web matrix upon application of water thereto, with the plant members 15 produced thereby directed through the mesh of the fourth web 14. The underlying first web 11 prevents projection of roots and the like into an underlying surface to permit removal of the web assembly 9, as required.

FIG. 2 illustrates the use of a support flange 20 formed with a plurality of support flange mounting bores 21 directed therethrough to permit securement and fastening of the mounting flange 17 to whatever underlying surfaces required. A plurality of spaced support flange hooks 22 are spaced apart a predetermined spacing projecting upwardly relative to a top surface of the support flange 20. The mat roll 16 formed of the web assembly 9 (see FIG. 4) includes a mat roll first end edge surface 16a, with a mounting flange 17 fixedly mounted to the end surface 16a. The mounting flange 17 includes mounting flange apertures 18 spaced apart the predetermined spacing to permit reception of the hooks 22 therethrough, with a mounting flange water-receiving slot 19 arranged medially of and in alignment with the third web matrix 13 to permit fluid flow into the third web matrix through the mounting flange 17.

Figure 8:
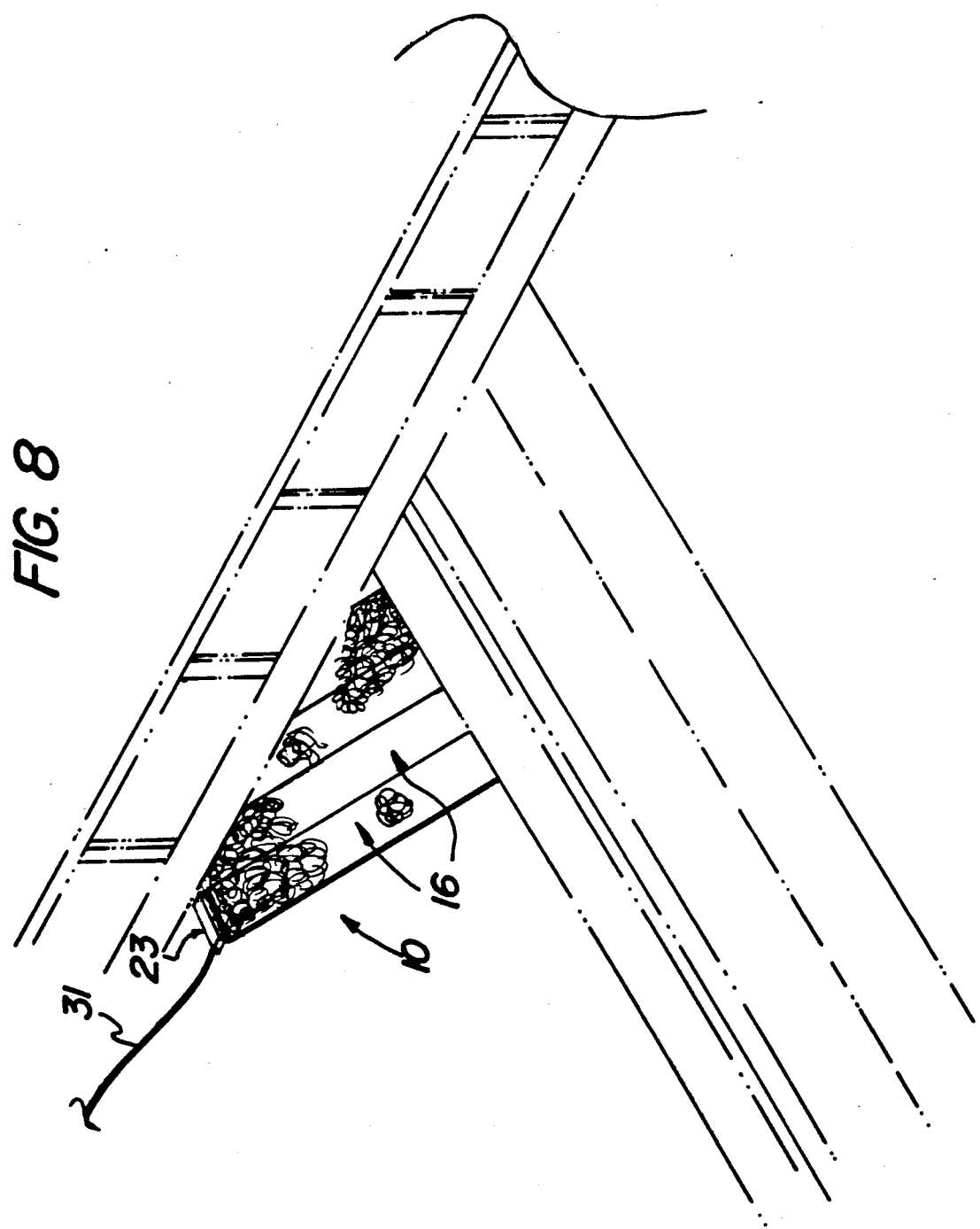
FIG. 8 is an isometric illustration of the invention arranged for mounting to an associated underlying surface, and particularly an inclined surface as illustrated.

The FIGS. 5-8 illustrate the use of a support housing 23 in lieu of the support flange 20. The support housing 23 includes a rear wall 24, a front wall 25, a bottom wall 26, and a top wall 27. Bottom wall hooks 28 spaced apart the predetermined spacing are mounted to the bottom wall at an intersection of the bottom wall to the rear wall 24. Top wall bores 29 permit rain water and the like to be directed through the top wall into a housing cavity 34 defined within the wall structure of the support housing 23, wherein the cavity 34 is arranged for reception of fertilizer 37 therewithin to permit enhanced growth of vegatation within the third web matrix 13. A rear wall extension flange 32 projects orthogonally upwardly of the top wall and is arranged in a coplanar relationship with the rear wall, to include a plurality of extension flange bores 33 for the fastening of the housing 23 to an underlying surface, such as illustrated in FIG. 8. The hooks 28 are arranged to be directed through the mounting flange apertures 18, as illustrated in the FIG. 6 for example. Bottom wall bores 26a thereby permit application of a fertilizer solution to be directed through the bottom wall bores 26a into the third web matrix 13 through the mounting flange water receiving slot 19 when mounted to the bottom wall hooks 28. A fluid feed externally threaded conduit 30 is mounted fixedly to the top wall 27 to receive a fluid hose 31 thereto to permit application of fluid into the cavity 34 in the absence or the prevention of application of rain water to the housing through the top wall bores 29, in a manner as illustrated in FIG. 8, when the organization is positioned such as below an underpass structure.

The housings 23 may be also assembled in an end-to-end relationship to provide for a covering structure of indeterminate length, wherein a housing end cap 35 is arranged for projection within the cavity into a first end of the housing 23, with a second end of the housing 23 including projecting housing wall flanges 36 complementarily received within an adjacent first end of an adjacent housing 23, as illustrated in FIG. 5, to provide for a structure of adjacent web assemblies 9 of mat roll 16, in a manner as illustrated in FIG. 8.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vegetation mat apparatus, comprising,
    a web assembly, including a flexible fluid impermeable polymeric first web and a fabric mesh second web mounted coextensively to a top surface of the first web, and
    a compacted peat moss third web matrix, including a matrix of vegetation seeds directed therethrough mounted coextensively to a top surface of the second web, and
    a fabric fourth web mounted coextensively to a top surface of the third web, wherein the second web and the fourth web receive expansion of the third web matrix when the third web matrix receives application of water thereto, and
    the web assembly includes a first end surface, wherein the first end surface includes a mounting flange mounted coextensively thereto, the mounting flange includes a plurality of mounting flange apertures directed through the mounting flange spaced apart a predetermined spacing, and a water receiving slot directed medially of the mounting flange aligned with the third web matrix.

2. An apparatus as set forth in claim 1 including a support housing, the support housing including a housing rear wall, a housing front wall, a housing bottom wall, and a housing top wall, the housing bottom wall including a plurality of bottom wall hooks fixedly mounted to the bottom wall extending exteriorly thereof spaced apart the predetermined spacing for projection within the mounting flange apertures.

3. An apparatus as set forth in claim 2 wherein the support housing includes a support housing cavity defined within the support housing, and the bottom wall including a plurality of bottom wall bores positioned through the bottom wall and aligned with the mounting flange water-receiving slot when the mounting flange is mounted to the bottom wall hooks.

4. An apparatus as set forth in claim 3 wherein the housing top wall includes a plurality of top wall bores directed therethrough in communication with the housing cavity, the housing cavity including a predetermined quantity of fertilizer contained therewithin permitting direction of rain water through the top wall bores into the housing cavity.

5. An apparatus as set forth in claim 4 including a rear wall extension flange arranged coplanar with the rear wall extending orthogonally beyond the top wall, wherein the rear wall extension flange includes a plurality of extension flange bores for securement of the extension flange and the support housing to an underlying surface.

6. An apparatus as set forth in claim 5 wherein the housing includes a housing first end opening and a housing second end opening, the housing first end opening further includes an end cap removably mounted within the first end opening, and the second end opening includes housing wall flanges for projection of the second end opening into an adjacent support housing first end opening.

* * * * *